United States Patent
Bauer et al.

(10) Patent No.: US 7,255,367 B2
(45) Date of Patent: *Aug. 14, 2007

(54) AIR BAG

(75) Inventors: Barney J. Bauer, Shelby Township, MI (US); Jerome Bosch, Clinton Township, MI (US); Brandon Marriott, Farmington Hills, MI (US); Nathaniel J. Dennis, Grand Blanc, MI (US); Vivekanandan Maripudi, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 244 days.

This patent is subject to a terminal disclaimer.

(21) Appl. No.: 10/908,952

(22) Filed: Jun. 1, 2005

(65) Prior Publication Data

US 2006/0186648 A1    Aug. 24, 2006

Related U.S. Application Data

(60) Provisional application No. 60/593,847, filed on Feb. 18, 2005.

(51) Int. Cl.
*B60R 21/233*    (2006.01)
(52) U.S. Cl. .................. 280/743.1; 280/729
(58) Field of Classification Search ............. 280/743.1, 280/729, 732, 742, 740; B60R 21/24
See application file for complete search history.

(56) References Cited

U.S. PATENT DOCUMENTS

| | | | |
|---|---|---|---|
| 4,006,918 A | 2/1977 | MacFarland | 280/729 |
| 5,172,933 A | 12/1992 | Strasser | 280/740 |
| 5,282,646 A | 2/1994 | Melvin et al. | 280/729 |
| 5,464,250 A | 11/1995 | Sato | 280/743.1 |
| 5,599,041 A | 2/1997 | Turnbull et al. | 280/724 |
| 6,019,390 A | 2/2000 | Keshavaraj | 280/743.1 |
| 6,158,765 A | 12/2000 | Sinnhuber | 280/728.3 |
| 6,170,857 B1 | 1/2001 | Okada et al. | 280/728.1 |
| 6,176,512 B1 | 1/2001 | Rodriguez | 280/728.2 |
| 6,260,881 B1 | 7/2001 | Ellerbrok et al. | 280/740 |

(Continued)

FOREIGN PATENT DOCUMENTS

DE    198 60 804 A1    7/2000

(Continued)

*Primary Examiner*—Paul N. Dickson
*Assistant Examiner*—Robert A. Coker
(74) *Attorney, Agent, or Firm*—Foley & Lardner LLP

(57) ABSTRACT

First and second air bag cushion portions are joined to form a bi-lobular air bag cushion with an opening adapted to receive inflation gas from an air bag inflator. A first inner panel forms first and second chambers in the first cushion portion and provide for fluid communication therebetween proximate to a distal portion thereof. A second inner panel forms third and fourth chambers in the second cushion portion and provide for fluid communication therebetween proximate to a distal portion thereof. Relatively inboard first and third chambers are in fluid communication with one another. The second and fourth chambers are in fluid communication with the opening. In another embodiment, first and second distribution tubes provide for fluid communication between the opening and relatively distal portions of the first and second cushion portions. The inner panels and the distribution tubes provide for lateral inflation of the bi-lobular air bag.

23 Claims, 2 Drawing Sheets

U.S. PATENT DOCUMENTS

| | | | |
|---|---|---|---|
| 6,352,284 B1 | 3/2002 | Okada et al. | 280/743.1 |
| 6,361,067 B1 | 3/2002 | Varcus et al. | 280/729 |
| 6,382,664 B1 | 5/2002 | Hirano et al. | 280/730.2 |
| 6,428,042 B1 | 8/2002 | Fischer et al. | 280/739 |
| 6,460,878 B2 | 10/2002 | Eckert et al. | 280/730.1 |
| 6,523,855 B2 | 2/2003 | Musiol et al. | 280/729 |
| 6,557,891 B2 | 5/2003 | Okada et al. | 280/743.1 |
| 6,568,708 B2 | 5/2003 | Miodek et al. | 280/740 |
| 7,000,943 B2 * | 2/2006 | Hasebe et al. | 280/729 |
| 2002/0017774 A1 | 2/2002 | Igawa | 280/728.2 |
| 2003/0034637 A1 | 2/2003 | Wang et al. | 280/729 |
| 2003/0201628 A1 | 10/2003 | Roychoudhury et al. | 280/729 |
| 2004/0145160 A1 * | 7/2004 | Hasebe et al. | 280/729 |
| 2004/0145161 A1 | 7/2004 | Hasebe et al. | 280/729 |
| 2004/0155439 A1 * | 8/2004 | Hasebe et al. | 280/729 |
| 2004/0155440 A1 | 8/2004 | Hasebe et al. | 280/729 |
| 2005/0104339 A1 * | 5/2005 | Hasebe et al. | 280/729 |
| 2005/0110249 A1 * | 5/2005 | Hasebe et al. | 280/729 |

FOREIGN PATENT DOCUMENTS

| | | |
|---|---|---|
| EP | 1 364 838 A | 11/2003 |
| EP | 1 452 403 A | 9/2004 |
| EP | 1452403 A1 * | 9/2004 |

* cited by examiner

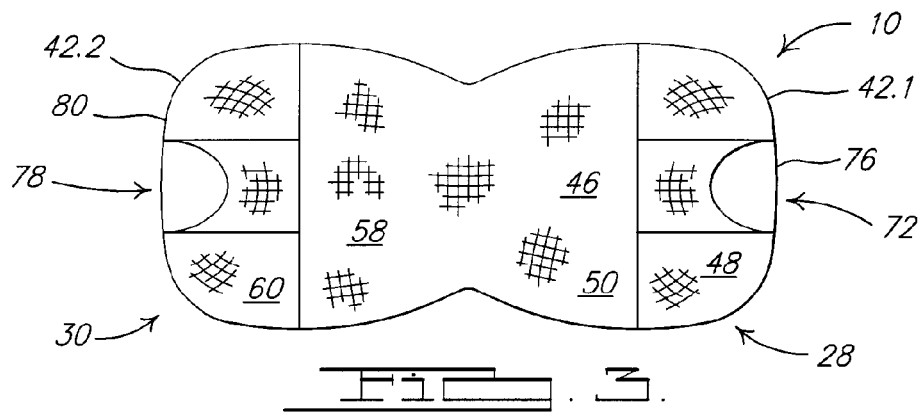
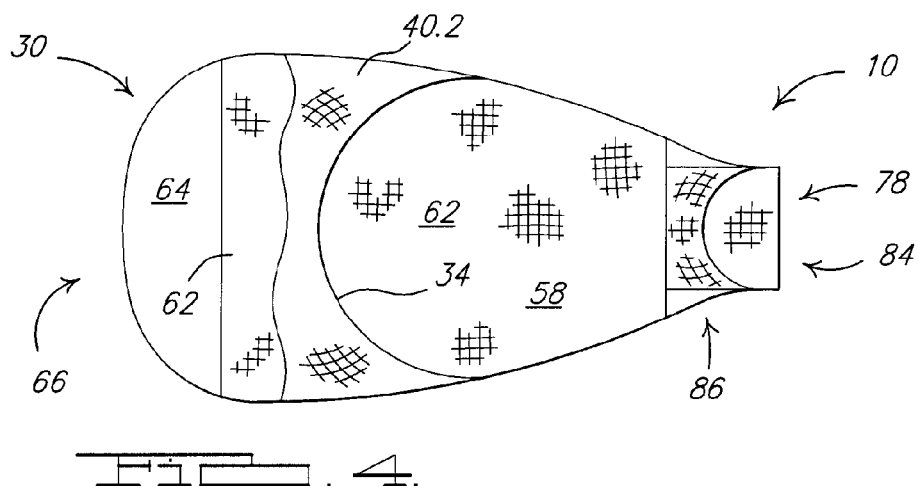
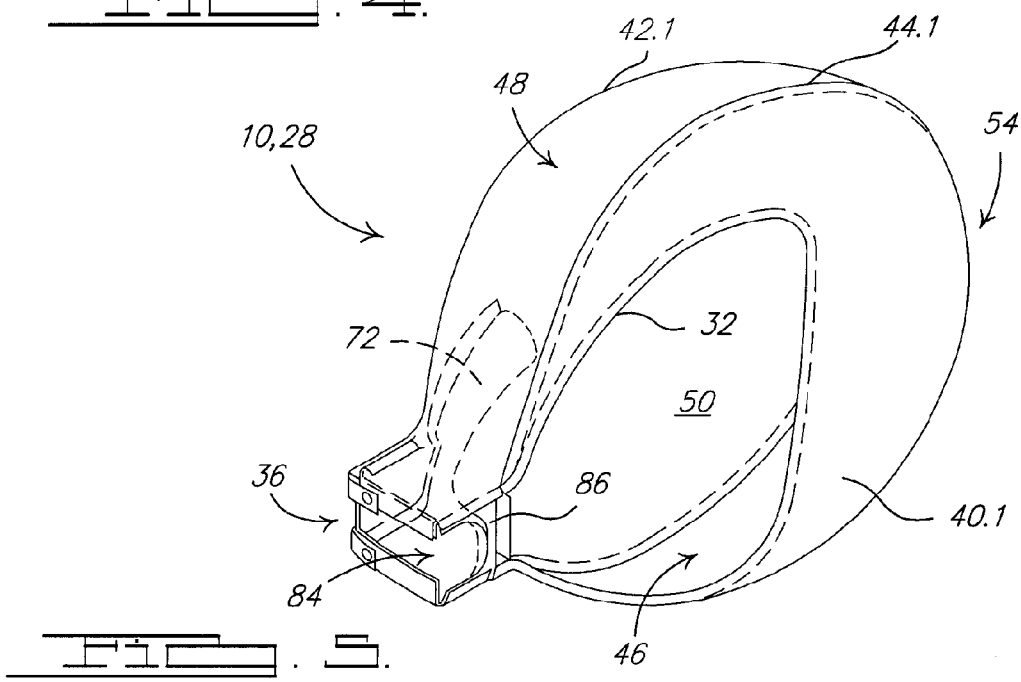

AIR BAG

CROSS-REFERENCE TO RELATED APPLICATIONS

The instant application claims the benefit of prior U.S. Provisional Application Ser. No. 60/593,847 filed on Feb. 18, 2005, which is incorporated herein by reference.

BRIEF DESCRIPTION OF THE DRAWINGS

In the accompanying drawings:

FIG. 3 illustrates a first cross-sectional view of the air bag illustrated in FIG. 2;

FIG. 4 illustrates a second cross-sectional view of the air bag illustrated in FIG. 2; and FIG. 5 illustrates an isometric view of a first air bag cushion portion in an inflated state, and a cross sectional view of an associated manifold proximate to the opening of the air bag.

DESCRIPTION OF EMBODIMENT(S)

Figure 1:
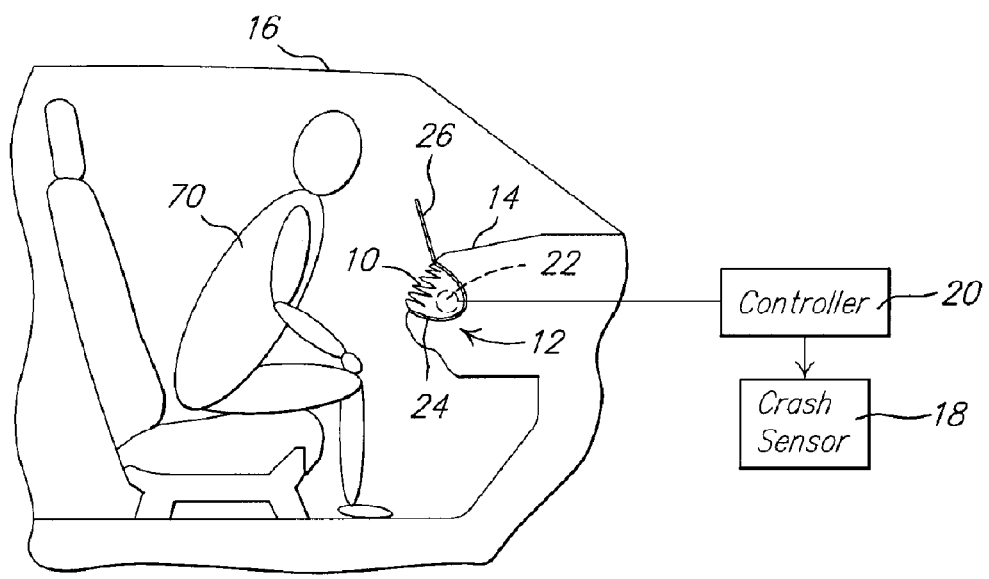
FIG. 1 illustrates an out-of-position occupant proximate to an air bag inflator module being actuated in a vehicle.

Referring to FIG. 1, an air bag 10 is incorporated in an associated air bag inflator module 12 installed with a mid-mount orientation in the instrument panel 14 of a vehicle 16 responsive to a crash of the vehicle 16, an associated crash sensor 18 signals a controller 20 to actuate an air bag inflator 22 of the air bag inflator module 12, whereby the air bag inflator 22 generates inflation gases that inflate the air bag 10 packed in the housing 24 of the air bag inflator module 12, the pressurization of which opens an associated air bag module door 26 prior to the deployment of the air bag 10 from the housing 24 of the air bag inflator module 12.

Referring to FIGS. 2-5, the inflated air bag 10 comprises first 28 and second 30 air bag cushion portions that are joined together along respective first 32 and second 34 inboard boundaries, and which together define an opening 36 that is adapted to operatively couple to the air bag inflator module 12 and receive inflation gas from the air bag inflator 22. For example, the first 32 and second 34 inboard boundaries may be joined together by sewing, bonding or welding, or they may be part of a single piece air bag 10 that is either joined together or molded, e.g. a blow-molded air bag 10, or a multiple component air bag 10 that is either joined together or molded. The profile of the first 32 and second 34 inboard boundaries is smaller than the corresponding outer profile of the first 28 and second 30 air bag cushion portions so that the combination of the first 28 and second 30 air bag cushion portions results in an overall bi-lobular air bag cushion 38.

The first 28 and second 30 air bag cushion portions are formed, for example, by joining associated respective first 40.1 and second 40.2 inboard panels and to respective first 42.1 and second 42.2 outboard panels, respectively, along associated first 44.1 and second 44.2 seams, as illustrated in greater detail in FIG. 5 for the first air bag cushion portion 28. For example, the first 40.1 and second 40.2 inboard panels and the first 42.1 and second 42.2 outboard panels may be constructed of air bag material known in the art, for example, a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gases generated by the air bag inflator 22 and for interacting with an occupant so as to provide for occupant restraint. Furthermore, the first 40.1 and second 40.2 inboard panels may be joined to the respective first 42.1 and second 42.2 outboard panels by sewing, bonding or welding, or they may be part of a single piece air bag 10 that is either joined together or molded, e.g. a blow-molded air bag 10, or a multiple component air bag 10 that is either joined together or molded.

In accordance with a first aspect, the first air bag cushion portion 28 is divided into first 46 and second 48 chambers by a first inner panel 50, which, for example, extends along the height of the first air bag cushion portion 28 from the junction of the first 32 and second 34 inboard boundaries proximate to the opening 36, to a relatively distal location within the first air bag cushion portion 28. For example, the edges of the first inner panel 50 are sewn into the first seam 44.1 joining the first inboard panel 40.1 to the first outboard panel 42.1 of the first air bag cushion portion 28. For example, in one embodiment, the first seam 44.1 is substantially laterally centered within the first air bag cushion portion 28. The first inner panel 50 is adapted to provide for fluid communication between the first 46 and second 48 chambers, for example, via a gap 52 between an end of the first inner panel 50 and the inside of a distal end 54 of the first air bag cushion portion 28. Alternatively, the first inner panel 50 could extend to the distal end 54 of the first air bag cushion portion 28, and a distal end 56 of the first inner panel 50 could be adapted with one or more orifices therein so as to provide for the fluid communication between the first 46 and second 48 chambers.

Further accordance with the first aspect, the second air bag cushion portion 30 is divided into third 58 and fourth 60 chambers by a second inner panel 62, which, for example, extends along the height of the second air bag cushion portion 30 from the junction of the first 32 and second 34 inboard boundaries proximate to the opening 36, to a relatively distal location within the second air bag cushion portion 30. For example, the edges of the second inner panel 62 are sewn into the second seam 44.2 joining the second inboard panel 40.2 to the second outboard panel 42.2 of the second air bag cushion portion 30. For example, in one embodiment, the second seam 44.2 is substantially laterally centered within the second air bag cushion portion 30. The second inner panel 62 is adapted to provide for fluid communication between the third 58 and fourth 60 chambers, for example, via a gap 64 between an end of the second inner panel 62 and the inside of a distal end 66 of the second air bag cushion portion 30. Alternatively, the second inner panel 62 could extend to the distal end 66 of the second air bag cushion portion 30, and a distal end 68 of the second inner panel 62 could be adapted with one or more orifices therein so as to provide for the fluid communication between the third 58 and fourth 60 chambers.

The first 50 and second 62 inner panels are, for example, joined to one another where they meet at the inboard boundaries 32, 34 of the first 28 and second 30 air bag cushion portions. The first 46 and third 58 chambers are in fluid communication across the inboard boundaries 32, 34 of the first 28 and second 30 air bag cushion portions. Furthermore, the second 48 and fourth 60 chambers are in fluid communication with the opening 36 of the air bag 10. Accordingly, the first 50 and second 62 inner panels provide for directing the inflation gases from the air bag inflator 22 first to the outer second 48 and fourth 60 chambers, and then to the central first 46 and third 58 chambers, which provides for urging a lateral inflation of the air bag 10. Typically the flow of inflation gases into the first 46 and third 58 chambers occurs later in the deployment process, but occurs sufficiently early so as to provide sufficient restraint capability in order to protect a normally seated relatively larger occupant from harm, but sufficiently late so as to not injure an out-of-position occupant 70 relatively early in the deployment process.

In accordance with a second aspect, a first distribution tube 72 provided between the opening 36 and a relatively distal portion 74 of the first air bag cushion portion 28 along an inside surface of an outboard boundary 76, e.g. the first outboard panel 42.1, thereof so a to provide for fluid communication therethrough and therealong between the opening 36 and the first air bag cushion portion 28. For example, in combination with the first aspect, the first distribution tube 72 provides for distributing inflation gas to a relatively distal portion 74 of the second chamber 48.

Further in accordance with a second aspect, a second distribution tube 78 provided between the opening 36 and a relatively distal portion 80 of the second air bag cushion portion 30 along an inside surface of an outboard boundary 82, e.g. the second outboard panel 42.2, thereof so a to provide for fluid communication therethrough and therealong between the opening 36 and the second air bag cushion portion 30. For example, in combination with the first aspect, the second distribution tube 78 provides for distributing inflation gas to a relatively distal portion 80 of the fourth chamber 60.

Figure 2:
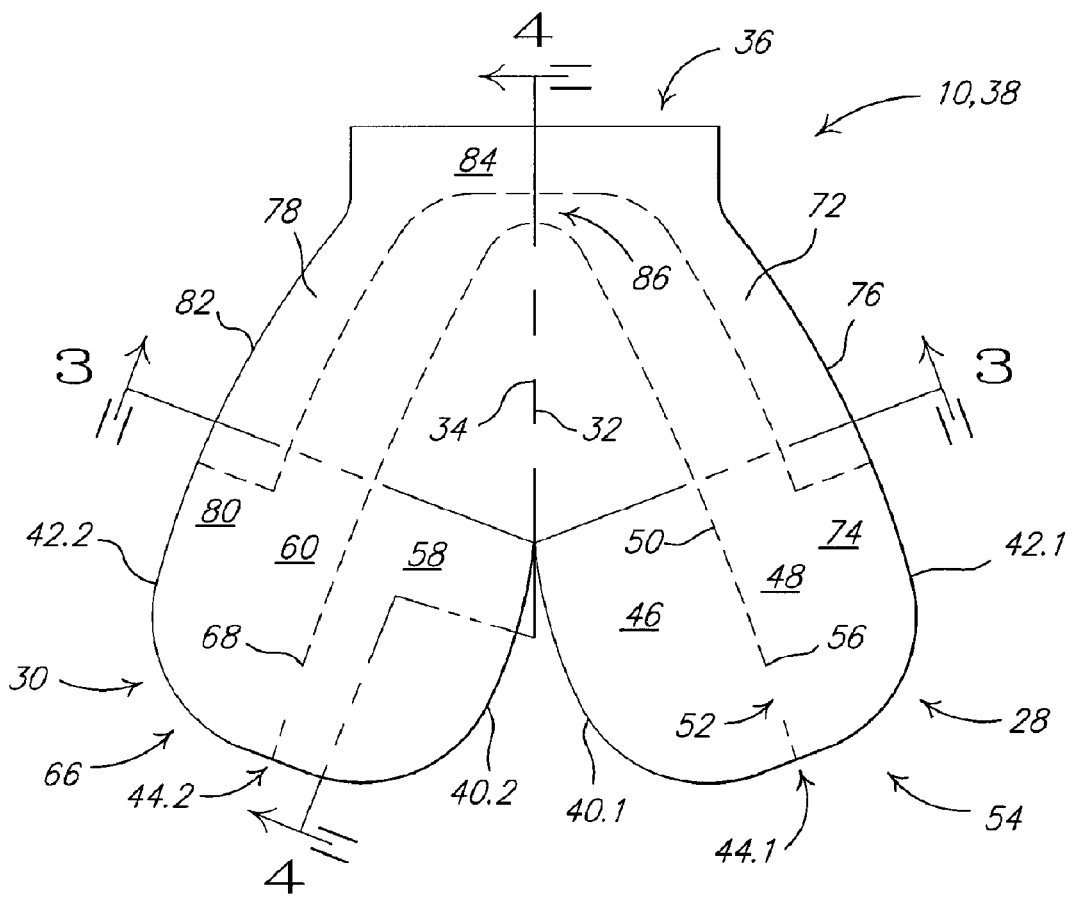
FIG. 2 illustrates a plan view of an inflated air bag incorporating several aspects.

Referring to FIGS. 2 and 5, in one embodiment, the first 72 and second 78 distribution tubes are either joined to one another proximate to the opening 36 so as to form a manifold 84 proximate to the opening 36, wherein the manifold provides for distributing inflation gas received through the opening 36 to either the first 72 or second 78 distribution tubes. Alternatively, the manifold 84 could be constructed of a separate element to which the first 72 and second 78 distribution tubes would be connected. For example, the manifold 84 is typically adapted so as to direct substantially all of the inflation gas received through the opening 36 to either the first 72 or second 78 distribution tubes. Furthermore, the manifold 84 may cooperate with the first 50 and second 62 inner panels so as to either provide for a gap 86 therebetween, as illustrated in FIGS. 2 and 5—thereby providing for fluid communication therethrough between the second 48 and fourth 60 chambers—or the first 50 and second 62 inner panels may be substantially sealed to the manifold 84.

For example, the first 72 and second 78 distribution tubes and the manifold 84 may be fabricated by joining one or more pieces of air bag material to the inside of the outboard boundaries 76, 82 of the air bag 10, or to the inside of the opening 36 of the air bag 10. For example, the first 72 and second 78 distribution tubes and the manifold 84 may be constructed of air bag material known in the art, for example, a fabric, e.g. of nylon or polyester weave, which may be coated, e.g. with a silicone rubber coating; some other material that is known for use in fabricating an air bag such as plastic film or polyolefin (e.g. TYVEK®), or some other material that is sufficiently flexible, strong and durable for use in confining inflation gases generated by the air bag inflator 22 and for interacting with an occupant so as to provide for occupant restraint. Furthermore, the first 72 and second 78 distribution tubes and the manifold 84 may be joined to the inside of the outboard boundaries 76, 82 or to the opening 36 by sewing, bonding or welding, or they may be part of a single piece air bag 10 that is either joined together or molded, e.g. a blow-molded air bag 10, or a multiple component air bag 10 that is either joined together or molded.

The first 72 and second 78 distribution tubes cause the inflation gas from the air bag inflator 22 to initially flow away from the center of the face of the air bag inflator module 12 and toward the two bag "wings" which form the right and left sides of the completed "split bag assembly". The initial gas flow toward the right and left of the air bag inflator module 12 causes the air bag 10 to initially deploy outward toward the right and left of the occupant so that contact pressures build up on either side of the occupant's chest rather than in the center thereof. Deployment to either side results in lower contact pressures on each side of the chest thus avoiding high center of chest loading.

The first and second aspects provide for reducing the injury level to an out-of-position occupant (OOP) for mid-mount air bag applications, for example, when a "split air bag" is utilized in a mid-mount application. A mid-mount air bag installation places the air bag module door 26 directly in front of the chest of a 3 year old or 6 year old dummy in the NHTSA-1 position (i.e. chest adjacent to panel), which can otherwise cause chest impact pressures to exceed the Federal Standard as the air bag module door begins to open and the air bag begins to deploy. By urging a lateral deployment of the air bag 10 to the left and right of the occupant so that contact pressures build up on either side of the chest rather than in the center, the center of chest overpressure can be reduced. Deployment to either side results in lower contact pressures on each side of the chest and avoids the high center of chest loading that could otherwise be problematic. Although the two aspects in combination provide for lowering the center of chest contact pressures for out-of-position occupants, thereby enabling the use of a "split air bag" in a vehicle requiring a mid-mount air bag configuration, it should be understood that either of the two aspects can also be used alone in particular air bag applications, also with beneficial results.

While specific embodiments have been described in detail, those with ordinary skill in the art will appreciate that various modifications and alternatives to those details could be developed in light of the overall teachings of the disclosure. Accordingly, the particular arrangements disclosed are meant to be illustrative only and not limiting as to the scope of the invention, which is to be given the full breadth of the appended claims and any and all equivalents thereof.

What is claimed is:

1. An air bag, comprising:
   a. A first opening adapted to receive inflation gas from an air bag inflator;
   b. a first air bag cushion portion;
   c. a second air bag cushion portion, wherein a first inboard boundary of said first air bag cushion portion is joined to a second inboard boundary of said second air bag cushion portion so that said first and second air bag cushion portions constitute a bi-lobular air bag cushion in fluid communication with said first opening;
   d. a first inner panel adapted to divide said first air bag cushion portion into a first chamber and a second chamber, wherein said first chamber is inboard of said second chamber, said first inner panel is adapted to provide for fluid communication between said first chamber and said second chamber proximate to a first end of said first air bag cushion portion, and said first end of said first air bag cushion portion is relatively distal with respect to said first opening; and e. a second inner panel adapted to divide said second air bag cushion portion into a third chamber and a fourth chamber, wherein said third chamber is inboard of said fourth chamber, said second inner panel is adapted to provide for fluid communication between said third chamber and said fourth chamber proximate to a first end of said second air bag cushion portion, said first end of said second air bag cushion portion is relatively distal with respect to said first opening, and said first chamber is in fluid communication with said third chamber at said first and second inboard boundaries.

2. An air bag as recited in claim 1, wherein said first and second air bag cushion portions are in fluid communication with one another through a second opening bounded by said first and second inboard boundaries.

3. An air bag as recited in claim 1, wherein said first and second inner panels are either joined to one another or are continuous with one another across said first and second inboard boundaries.

4. An air bag as recited in claim 1, further comprising a first distribution tube operative between said first opening and a relatively distal portion of said first air bag cushion portion along an inside of an outboard boundary of said first air bag cushion portion so as to provide for said fluid communication between said first opening and said first air bag cushion portion, wherein said first distribution tube is in fluid communication with said second chamber of said first air bag cushion portion.

5. An air bag as recited in claim 4, further comprising a second distribution tube operative between said first opening and a relatively distal portion of said second air bag cushion portion along inside of an outboard boundary of said second air bag cushion portion so as to provide for said fluid communication between said first opening and said second air bag cushion portion, wherein said second distribution tube is in fluid communication with said fourth chamber of said second air bag cushion portion.

6. An air bag as recited in claim 5, wherein said first and second distribution tubes either constitute or are operatively coupled to a manifold proximate to said first opening, said manifold is adapted to receive said inflation gas through said first opening, and said manifold is adapted to distribute said inflation gas to said first and second distribution tubes so as to provide for distributing said inflation gas to said second and fourth chambers.

7. An air bag as recited in claim 6, wherein said first and second inner panels are either joined to one another or are continuous with one another across said first and second inboard boundaries, and said first and second inner panels are joined to said manifold so as to inhibit a fluid communication between said second and fourth chambers proximate to said manifold.

8. An air bag as recited in claim 6, wherein said first and second inner panels are either joined to one another or are continuous with one another across said first and second inboard boundaries, and said first and second inner panels adapted so as to provide for fluid communication between said second and fourth chambers proximate to said manifold.

9. An air bag, comprising:
a. a first opening adapted to receive inflation gas from an air bag inflator;
b. a first air bag cushion portion;
c. a second air bag cushion portion, wherein a first inboard boundary of said first air bag cushion portion is joined to a second inboard boundary of said second air bag cushion portion so that said first and second air bag cushion portions constitute a bi-lobular air bag cushion in fluid communication with said first opening;
d. a first distribution tube operative between said first opening and a relatively distal portion of said first air bag cushion portion along an inside of an outboard boundary of said first air bag cushion portion so as to provide for said fluid communication between said first opening and said first air bag cushion portion.

10. An air bag as recited in claim 9, further comprising a second distribution tube operative between said first opening and a relatively distal portion of said second air bag cushion portion along inside of an outboard boundary of said second air bag cushion portion so as to provide for said fluid communication between said first opening and said second air bag cushion portion.

11. An air bag as recited in claim 10, wherein said first and second distribution tubes either constitute or are operatively coupled to a manifold proximate to said first opening, said manifold is adapted to receive said inflation gas through said first opening, and said manifold is adapted to distribute said inflation gas to said first and second distribution tubes so as to provide for distributing said inflation gas to said first and second air bag cushion portions.

12. A method of providing for protecting an occupant with an airbag responsive to a crash, comprising:
a. providing for a bi-lobular air bag cushion comprising first and second cushion portions joined to one another along a common inboard boundary;
b. providing for a first opening in said bi-lobular air bag cushion adapted to receive inflation gas from an air bag inflator, wherein said first and second cushion portions are in fluid communication with one another across a second opening bounded by said common inboard boundary, and said first opening is bounded by said first and second cushion portions proximate to said second opening;
c. providing for dividing said first air bag cushion portion into first and second chambers, wherein said first chamber is inboard of said second chamber;
d. providing for fluid communication between said first and second chambers proximate to a first end of said first air bag cushion portion relatively distal with respect to said first opening;
e. providing for dividing said second air bag cushion portion into third and fourth chambers, wherein said third chamber is inboard of said fourth chamber;
f. providing for fluid communication between said third and fourth chambers proximate to a first end of said second air bag cushion portion relatively distal with respect to said first opening;
g. providing for fluid communication between said first opening and said second chamber; and
h. providing for fluid communication between said first opening and said fourth chamber.

13. A method of providing for protecting an occupant with an airbag responsive to a crash as recited in claim 12, further comprising providing for inhibiting fluid communication between said first opening and said first and third chambers other than through said second or fourth chambers.

14. A method of providing for protecting an occupant with an airbag responsive to a crash as recited in claim 12, wherein the operation of providing for fluid communication between said first opening and said second chamber comprises providing for fluid communication from said first opening to a relatively distal portion of said second chamber through a first distribution tube along an outboard side of said second chamber.

15. A method of providing for protecting an occupant with an airbag responsive to a crash as recited in claim 14, further comprising providing for inhibiting fluid communication between said first opening and said second chamber other than through said first distribution tube or with said third or fourth chamber.

16. A method of providing for protecting an occupant with an airbag responsive to a crash as recited in claim 14, further comprising providing for inhibiting fluid communication between said first opening and said second chamber other than through said first distribution tube or with said third chamber.

17. A method of providing for protecting an occupant with an airbag responsive to a crash as recited in claim 14, wherein the operation of providing for fluid communication between said first opening and said fourth chamber comprises providing for fluid communication from said first opening to a relatively distal portion of said fourth chamber through a second distribution tube along an outboard side of said fourth chamber.

18. A method of providing for protecting an occupant with an airbag responsive to a crash as recited in claim 17, further comprising providing for inhibiting fluid communication between said first opening and said second chamber other than through said first distribution tube or with said third or fourth chamber, and providing for inhibiting fluid communication between said first opening and said fourth chamber other than through said second distribution tube or with said first or second chamber.

19. A method of providing for protecting an occupant with an airbag responsive to a crash as recited in claim 17, further comprising providing for inhibiting fluid communication between said first opening and said second chamber other than through said first distribution tube or with said third chamber, and providing for inhibiting fluid communication between said first opening and said second chamber other than through said second distribution tube or with said third chamber.

20. A method of providing for protecting an occupant with an airbag responsive to a crash, comprising:

a. providing for a bi-lobular air bag cushion comprising first and second cushion portions joined to one another along a common inboard boundary;

b. providing for a first opening in said bi-lobular air bag cushion adapted to receive inflation gas from an air bag inflator, wherein said first and second cushion portions are in fluid communication with one another across a second opening bounded by said common inboard boundary, and said first opening is bounded by said first and second cushion portions proximate to said second opening; and c. providing for fluid communication from said first opening to a relatively distal portion of said first cushion portion through a first distribution tube along an outboard side of said first cushion portion.

21. A method of providing for protecting an occupant with an airbag responsive to a crash as recited in claim 20, further comprising providing for inhibiting fluid communication between said first opening and said second chamber other than through said first distribution tube or with said second cushion portion.

22. A method of providing for protecting an occupant with an airbag responsive to a crash as recited in claim 20, further comprising providing for fluid communication from said first opening to a relatively distal portion of said second cushion portion through a second distribution tube along an outboard side of said second cushion portion.

23. A method of providing for protecting an occupant with an airbag responsive to a crash as recited in claim 20, further comprising providing for inhibiting fluid communication between said first opening and said second chamber other than through said first distribution tube or with said second cushion portion, and providing for inhibiting fluid communication between said first opening and said second chamber other than through said second distribution tube or with said first cushion portion.

* * * * *